Nov. 11, 1941.  R. H. SCOTT ET AL  2,262,206
ELECTRICALLY HEATED MELTING POT FOR TYPOGRAPHICAL CASTING MACHINES
Filed Jan. 18, 1939
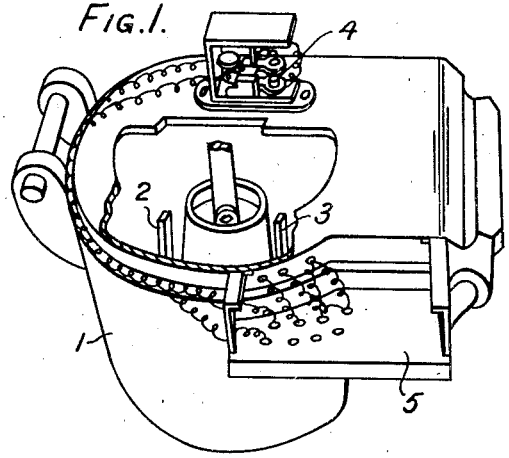
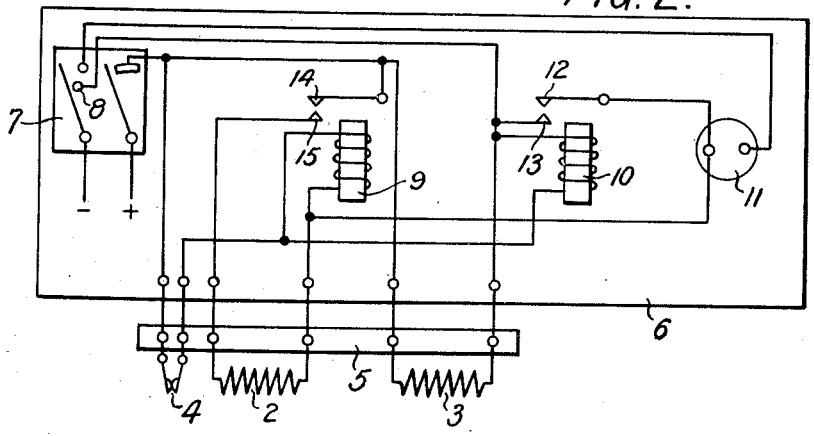
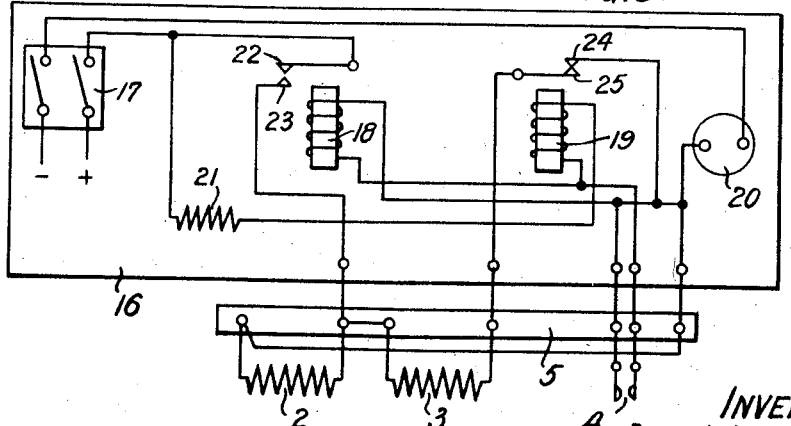
INVENTORS
Richard H. Scott
William Brown
By Morrison, Kennedy & Campbell
ATTORNEYS Patented Nov. 11, 1941

2,262,206

UNITED STATES PATENT OFFICE 2,262,206

ELECTRICALLY HEATED MELTING POT FOR TYPOGRAPHICAL CASTING MACHINES

Richard Henry Scott, Enfield, and William Brown, Altrincham, England, assignors to Linotype and Machinery Limited, London, England, a company of Great Britain Application January 18, 1939, Serial No. 251,624
In Great Britain January 18, 1938

8 Claims. (Cl. 219—20)

This invention relates to improvements in the construction of electrically heated melting pots for typographical casting machines.

In melting pots hitherto employed for this purpose the casting metal is melted by means of two or more electrical heating elements, a switch member being provided so that after the metal in the pot has been melted by means of one electrical heating element, an alternative heating element which maintains the molten metal at the desired temperature is brought into circuit by operation of the switch member. With this arrangement some time elapses before the metal in the pot is sufficiently molten for casting or for bringing the alternative heating element into use, and, it is the object of the present invention to decrease the time taken up in melting the metal and to automatically maintain the molten metal at the desired temperature.

According to this invention, the metal is first melted by means of two or more electrical heating elements, and, when the metal has been melted, the number of heating elements in use is automatically reduced and the metal pot kept at a desired uniform temperature.

Preferably the metal in the pot is first heated by means of a plurality of heating elements, and when the metal has become molten and has been raised to the working temperature, a thermostatic device causes all the elements to be disconnected from the electric current supply. When, thereafter, the temperature falls to a predetermined extent, the thermostatic device is arranged to bring into circuit a reduced number of heating elements for the purpose of maintaining the metal at the desired temperature.

In the accompanying drawing:

Figure 1 is a view of the metal pot with a part broken away to show the heating elements, and the cover of the thermostat removed;

Figure 2 is a diagram showing the arrangement according to one constructional form of the invention; and Figure 3 is a diagram of an alternative constructional form of the invention.

Referring to the constructional form of the invention shown in Figure 2, the metal pot 1 is provided with two separate pot heating elements 2, 3, and an electric thermostat 4, having normally closed contacts, the connections from these devices being brought to a terminal board 5 on the exterior of the pot 1. This terminal board is connected to terminals on a conveniently located regulator panel 6, to which is fixed the switch gear and control mechanism. This mechanism preferably consists of a double pole main switch 7, fitted with an additional contact 8, (Figure 2), two electro-magnetic relays 9, 10, for controlling the respective heating elements and an ammeter 11. When the main switch 7 is closed, the switch blade momentarily connects with the additional contact 8, and current passes through the thermostat 4 and the coil winding of the relay 10, thus closing contacts 12, 13, which keep the relay 10 closed and allow current to pass through the heating element 3.

The main switch 7 is finally closed, causing current to pass through the thermostat 4 and causing the coil winding of the other relay 9 to be energised, thus closing contacts 14, 15, which allow current to pass through the heating element 2. When the metal is melted, the thermostat breaks the circuit to the windings of the two relays 9, 10, thus causing the heating elements 2 and 3 to be disconnected from the current supply. When the temperature falls to a certain extent, the thermostat contacts close thus allowing current to pass through the relay 9 to the working element 2. As the relay 10 and auxiliary element 3 can only be brought into operation by momentary connection between the switch blade and additional contact 8, during closing of the main switch 7, the metal pot is now maintained at working temperature by means of the one working element 2 only.

The circuit maintains this condition until the main double pole switch 7 is open and closed when both elements 2 and 3 are brought into use, and the above described sequence of operations is repeated.

Referring to the alternative arrangement shown in Figure 3, the metal pot is provided with a thermostat having normally open contacts and the terminal board 5 on the exterior of the pot is connected to terminals on a conveniently located regulator panel 16, to which is affixed the switch gear and control mechanism. This mechanism consists of a double pole main switch 17, two electro-magnetic relays 18, 19, an ammeter 20 and a resistance 21. When the main switch 17 is open, the switch contacts 22, 23, controlled by relay 18, are open and the switch contacts 24, 25, on the relay 19 are closed. All the above devices are connected as shown in Figure 3, so that when the main double pole switch 17 is closed the following takes place:

Current passes from one pole of the main switch 17, through the resistance 21, through the winding of relay 19, and through the winding of relay 18 which is in series therewith, and through the ammeter 20 back to the other pole of the main switch 17. The relays 18 and 19 are so arranged that the current now passing through this circuit is sufficient to actuate relay 18 but not sufficient to actuate the relay 19. The relay 18 is thus actuated and the switch contacts 22, 23, controlled thereby are closed to allow current from one pole of the main switch 17 to pass through the element 2 to the other pole of the main switch. As the contacts 24, 25, controlled by relay 19 are closed current also passes through the heating element 3 so that both elements 2 and 3 are rendered active.

When a predetermined temperature of the molten metal is reached, the contacts of the thermostat close and short-circuit the winding of relay 18, causing the contacts 22, 23, to open and the element 2 to be disconnected. This short-circuiting of the winding of the relay 18 decreases the resistance of the circuit with which the winding of the relay 19 is in series and allows more current to pass through the winding of relay 19. This increase in current is sufficient to allow the winding of relay 19 to open the contacts 24, 25, thus disconnecting the element 3. Both elements are thus disconnected until the temperature of the metal pot has fallen to such an extent that the contacts on the thermostat again open. When these contacts on the thermostat open, the winding of relay 18 is again energised, thus bringing the working element 2 into circuit. The current passing through the winding of relay 19 is sufficient to hold contacts 24, 25 apart, so that the auxiliary element 3 remains disconnected and only the working element 2 under the control of the thermostat is now being used to heat the metal pot.

The circuit is maintained in this condition with the working element 2 controlled by the thermostat in use until the main double pole switch 7 is opened and closed when both the elements 2 and 3 are brought into use and the above described sequence of operations repeated.

Having described our invention, we declare that what we claim and desire to secure by Letters Patent is:

1. An electrical circuit for controlling the energizing of a plural element device for heating the melting pot of a typographical casting machine, and which comprises a circuit portion wherein the plurality of heating elements are arranged, a corresponding plurality of contact sets, i. e., one set for each heating element, which sets when closed are adapted to connect the heating elements in parallel in said circuit portion and when open to render the heating elements inactive, a separate electromagnetic relay connected in another circuit portion for operating each of said contact sets and means for connecting the circuit to a source of electrical energy and acting when initially operated to energize all the heating elements, and a thermostat having a single set of mutually cooperative contacts connected directly in the relay circuit portion and functioning when the metal initially reaches a predetermined temperature to cause the relays simultaneously to open the contact sets and render the heating elements inactive, said relay circuit connections being such that after the initial opening of the contact sets, a fewer number thereof are closed and opened by the operation of the thermostat as the metal subsequently falls below or reaches a predetermined temperature, the heating elements associated with any of the contact sets not so operated being maintained out of parallel relation with the remainder of the heating elements.

2. An electrical circuit for controlling the energizing of a plural element device for heating the melting pot of a typographical casting machine, and which comprises a circuit portion including a working heating element and an auxiliary heating element, a set of contacts for each of said elements adapted, when closed, to connect the heating elements in parallel in said circuit portion and, when open, to render the heating elements inactive, a separate electromagnetic relay, connected in another circuit portion, for operating each set of contacts, means for connecting the circuit portions to a source of electrical energy, said means acting when initially operated to energize both the heating elements, and a thermostat having a single set of mutually cooperative contacts connected directly in the relay circuit portion and functioning when the metal initially reaches a predetermined temperature to cause the relays simultaneously to open the contact sets and render both heating elements inactive, said relay circuit connections being such that, after the initial opening of the contact sets, only that set associated with the working element is closed and opened by the operation of the thermostat as the metal subsequently falls below or reaches a predetermined temperature.

3. An electrical circuit for controlling the energizing of a plural element device for heating the melting pot of a typographical casting machine, and which comprises a circuit portion including a working heating element and an auxiliary heating element, a set of contacts for each of said elements adapted, when closed, to connect the heating elements in parallel in said circuit portion and, when open, to render the heating elements inactive, a separate electromagnetic relay, connected in another circuit portion, for operating each set of contacts, a main switch for connecting the circuit portions to a source of electrical energy and which is provided with an auxiliary contact adapted when the switch is initially closed to energize the relay operating the set of contacts associated with the auxiliary heating element so as to close the same, and a thermostat having a single set of mutually cooperative contacts connected directly in the relay circuit portion and functioning when the metal initially reaches a predetermined temperature to cause the relays simultaneously to open the contact sets and render both heating elements inactive, said relay circuit connections being such that, after the initial opening of the contact sets, only that set associated with the working element is closed and opened by the operation of the thermostat as the metal subsequently falls below or reaches a predetermined temperature.

4. An electrical circuit for controlling the energizing of a plural element device for heating the melting pot of a typographical casting machine, and which comprises a circuit portion including a working heating element and an auxiliary heating element, a set of normally open contacts for each of said elements adapted, when closed, to connect the heating elements in parallel in said circuit portion and, when open, to render the heating elements inactive, a separate electromagnetic relay, connected in another circuit portion, for operating each set of contacts, a main switch for connecting the circuit portions to a source of electrical energy and which is adapted when initially closed to energize the relays and close the contact sets, and a thermostat having a single set of mutually cooperative contacts connected directly in the relay circuit and functioning when the metal initially reaches a predetermined temperature to cause the relays simultaneously to open the contact sets and render both heating elements inactive, said relay circuit connections being such that, after the initial opening of the contact sets, only that set associated with the working element is closed and opened by the operation of the thermostat as the metal subsequently falls below or reaches a predetermined temperature.

5. An electrical circuit for controlling the energizing of a plural element device for heating the melting pot of a typographical casting machine, and which comprises a circuit portion including a working heating element and an auxiliary heating element, a set of normally open contacts for each of said elements adapted, when closed, to connect the heating elements in parallel in said circuit portion and, when open, to render the heating elements inactive, a separate electromagnetic relay, connected in another circuit portion, for operating each set of contacts, a main switch for connecting the circuit portions to a source of electrical energy and which is adapted when initially closed to energize the relays and close the contact sets, and a thermostat having a single set of normally closed mutually cooperative contacts connected directly in the relay circuit portion, which contacts open when the metal initially reaches a predetermined temperature to cause the relays simultaneously to open the contact sets and render both heating elements inactive, said relay circuit connections being such that after the initial opening of the contact sets only that set associated with the working element is closed and opened by the subsequent closing and opening of the thermostat contacts.

6. An electrical circuit for controlling the energizing of a plural element device for heating the melting pot of a typographical casting machine, and which comprises a circuit portion including a working heating element and an auxiliary heating element, a set of normally open contacts for each of said elements adapted, when closed, to connect the heating elements in parallel in said circuit portion and, when open, to render the heating elements inactive, a separate electromagnetic relay connected in another circuit portion for operating each set of contacts, a main switch for connecting the circuit portions to a source of electrical energy and which is adapted, when initially closed, to energize the relays and close the contact sets, the initial closing of the relay associated with the auxiliary heating element being effected through an auxiliary contact with which the main switch is provided, and a thermostat having a single set of normally closed mutually cooperative contacts connected directly in the relay circuit portion, which contacts open when the metal initially reaches a predetermined temperature to cause the relays simultaneously to open the contact sets and render both heating elements inactive, said relay circuit connections being such that after the initial opening of the contact sets only that set associated with the working element is closed and opened by the subsequent closing and opening of the thermostat contacts.

7. An electrical circuit for controlling the energizing of a plural element device for heating the melting pot of a typographical casting machine, and which comprises a circuit portion including a working heating element and an auxiliary heating element, a set of contacts for each of said elements adapted, when closed, to connect the heating elements in parallel in said circuit portion and, when open, to render the heating elements inactive, the contact set associated with the working element being normally open whereas that associated with the auxiliary element is normally closed, a separate electromagnetic relay connected in another circuit portion for operating each set of contacts, a main switch for connecting the circuit portions to a source of electrical energy and which is adapted, when initially closed, to energize the relay circuit portion thereby closing the contact set associated with the working element and energizing both heating elements, and a thermostat having a single set of mutually cooperative contacts connected directly in the relay circuit portion and operating, when the metal initially reaches a predetermined temperature, to cause the relays simultaneously to open the contact sets and render both heating elements inactive, said relay circuit connections being such that after the initial opening of the contact sets, only that set associated with the working element is closed and opened by the operation of the thermostat as the metal subsequently falls below or reaches a predetermined temperature.

8. An electrical circuit for controlling the energizing of a plural element device for heating the melting pot of a typographical casting machine, and which comprises a circuit portion including a working heating element and an auxiliary heating element, a set of contacts for each of said elements adapted, when closed, to connect the respective heating elements in parallel in said circuit portion and, when open, to render the heating elements inactive, the contact set associated with the working element being normally open and the contact set associated with the auxiliary element being normally closed, a separate electromagnetic relay for operating each set of contacts and having their windings in series and connected in a circuit portion different from that in which the heating elements are located, a main switch for connecting the circuit portions to a source of electrical energy and which is adapted, when initially closed, to energize the relay operating the contact set associated with the working element so as to close said contact set whereby both the heating elements are rendered active, and a thermostat with a single set of normally open mutually cooperative contacts operating, when the metal initially reaches a predetermined temperature, to short-circuit the winding of the relay associated with the working element and increase the current flow in the winding of the relay associated with the auxiliary element thereby opening the contact sets operated by both relays and rendering both heating elements inactive, said relay circuit connections being such that after the initial opening of the contact sets, the set associated with the auxiliary element is maintained open, whereas the set associated with the working element is closed and opened by the subsequent opening and closing of the thermostat contacts.

RICHARD HENRY SCOTT.
WILLIAM BROWN.